United States Patent [19]

Shih et al.

[11] Patent Number: 5,009,502
[45] Date of Patent: Apr. 23, 1991

[54] SYSTEM OF HOLOGRAPHIC OPTICAL ELEMENTS FOR TESTING LASER RANGE FINDERS

[75] Inventors: I-Fu Shih, Los Alamitos; David B. Chang, Tustin; James A. Arns, Los Angeles; Gaylord E. Moss, Marina Del Rey; Ronald T. Smith, Redondo Beach, all of Calif.

[73] Assignee: Hughes Aircraft Company, Los Angeles, Calif.

[21] Appl. No.: 341,010

[22] Filed: Apr. 20, 1989

[51] Int. Cl.$^5$ .............................. G02B 5/32; G01C 3/08
[52] U.S. Cl. ........................................ 356/152; 350/3.6; 350/3.72; 356/5
[58] Field of Search ................. 350/3.6, 3.7, 3.72, 350/3.77; 356/4, 5, 152, 354, 363

[56] References Cited

U.S. PATENT DOCUMENTS

| | | | |
|---|---|---|---|
| 4,068,952 | 1/1978 | Erbert et al. | 356/5 |
| 4,121,890 | 10/1978 | Braun | 356/5 |
| 4,342,514 | 8/1982 | Mathews | 356/5 |
| 4,432,640 | 2/1984 | Grage et al. | 356/5 |
| 4,451,146 | 5/1984 | Grage et al. | 356/5 |
| 4,452,454 | 11/1985 | Glaser et al. | 356/5 |
| 4,464,115 | 8/1984 | Simpson et al. | 356/5 |
| 4,497,534 | 2/1985 | Sincerbox | 350/3.72 |
| 4,789,977 | 12/1988 | Oudenhuysen et al. | 350/3.72 |

Primary Examiner—Bruce Y. Arnold
Assistant Examiner—J. P. Ryan
Attorney, Agent, or Firm—Michael W. Sales; Wanda Denson-Low

[57] ABSTRACT

A focusing, collimating, and beamsplitting test system for testing laser rangefinders for their beam quality, ranging accuracy, and sight unit alignment. The system includes holographic optical elements in place of conventional mirrors, lenses and beamsplitters. The advantages of this system are that it not only reduces the size and weight of optical elements, but also reduces the number of required elements. Consequently, the resulting test equipment requires less labor to assemble and is more compact and much lighter than conventional test systems.

10 Claims, 2 Drawing Sheets

SYSTEM OF HOLOGRAPHIC OPTICAL ELEMENTS FOR TESTING LASER RANGE FINDERS

BACKGROUND OF THE INVENTION

The present invention relates to the field of testing equipment for electro-optical systems such as laser rangefinder/designators, and more particularly to an improved test system which employs holographic optical elements.

A laser rangefinder is an equipment which can send out laser pulses and detect the returning pulses reflected from the target; the delay time of the pulses determines the target range. The equipment also contains a sight unit for the operator to aim at the selected target.

A laser designator is an equipment similar to the laser rangefinder, except that its purpose is to illuminate the selected target. The scattered laser energy is used to guide "smart" bombs or artillery for converging into the target.

The laser designator and the laser rangefinder are sometimes combined into one piece of equipment.

For a laser rangefinder or designator to be useful, its laser output must meet certain energy level and beam divergence requirements. The alignment between the sight unit and the laser pointing must be properly maintained. And, the subsystem for measuring the delay of return signals must function correctly. It is thus necessary to test the equipment periodically for its output, alignment and ranging accuracy.

Presently, the laser beam quality can be tested with, for example, an automatic laser test set (ALTS) marketed by Hughes Aircraft Company. The ALTS equipment uses diode matrix array to record the laser beam intensity profile. The analysis of this profile will give the information on beam energy, divergence and pointing. When coupled with a visual reticle by the use of a beamsplitter, the ALTS can also be used to test beam alignment. The ranging accuracy can be tested with, for example, a simulated optical range target (SORT), also developed by Hughes Aircraft Company. The SORT equipment includes focusing optics and an optical fiber delay line. The laser energy is focused into one end of the fiber and reflected back from the other end. The laser energy re-emits from the first end with proper delay time and attenuation to simulate the return signal. The return signal then travels back to the rangefinder for ranging test.

Conventional lenses, beamsplitters and mirrors can be used to combine the ALTS and the SORT equipment with the visual reticle into a compact package to test the rangefinder for its beam quality, alignment and ranging accuracy. However, the disadvantages of this approach include the following: (1) traditional mirrors, lenses, and beamsplitters are bulky and heavy; and (2) mechanical design and assembly processes are complicated by the relatively large number of optical elements involved.

SUMMARY OF THE INVENTION

It would therefore be advantageous to provide a test set for testing electro-optical systems, which has optical elements of reduced size and weight in comparison to existing test set equipment.

It would further represent an advance in the art to provide a test set for electro-optical systems which employs fewer optical elements than existing test set equipment.

In accordance with the invention, a system for testing a laser rangefinder device is described. The system comprises a visual test reticle image, an optical delay line having a predetermined optical path length, and a detector array responsive to incident laser energy generated by the rangefinder.

In accordance with the invention, the system comprises a first holographic optical element, comprising means for collimating reticle image light emitted from the visual reticle and directing the collimated light along a first optical path into the sight-unit of the rangefinder, and means for focusing laser light emitted along a second optical path from the laser transmitter onto the optical delay line and for directing light from the optical delay line back to the laser receiver of the rangefinder.

A second holographic optical element is disposed in the optical path between the first holographic optical element and the delay line and comprises means for reflecting and refocusing a portion of the laser light energy emitted by the laser onto the detector array.

The positions of the visual reticle and the detector array are selected so that when the sight unit of the rangefinder is aligned such that the visible reticle is visible therein, laser light emitted from the laser transmitter is directed to the center of the detector array when the sight unit and the laser transmitter are properly aligned.

The system further provides the capability of range calibration of the rangefinder since the optical delay line provides a simulated optical target image at a predetermined, simulated range.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

The invention exploits the multi-functional property of holographic optical elements (HOEs). Holographic optical elements are holograms that function as ordinary optical elements, such as lenses, mirrors or beamsplitters. Most holograms are made by recording the interference pattern of two or more waves of mutually coherent light. See, "Handbook of Optical Holography," H.J. Caulfield, Academic Press, 1979, at page 573. As will be described, a preferred embodiment of the invention employs two HOEs. Each of the two HOEs has both focusing and beamsplitting functions. Moreover, the off-axis configuration of this embodiment avoids the unwanted zerothorder interference, thus providing a high performance system. As is well known in the HOE art, the zeroth-order interference results, in the case of a transmissive mode HOE, from light which passes directly through the HOE undiffracted, or in the case of a reflective mode HOE, from light which is simply reflected from the HOE, as from an ordinary mirror. The off-axis configuration of the system of claim 1 results in the zeroth-order light being directed away from the directions of interest.

Figure 1:
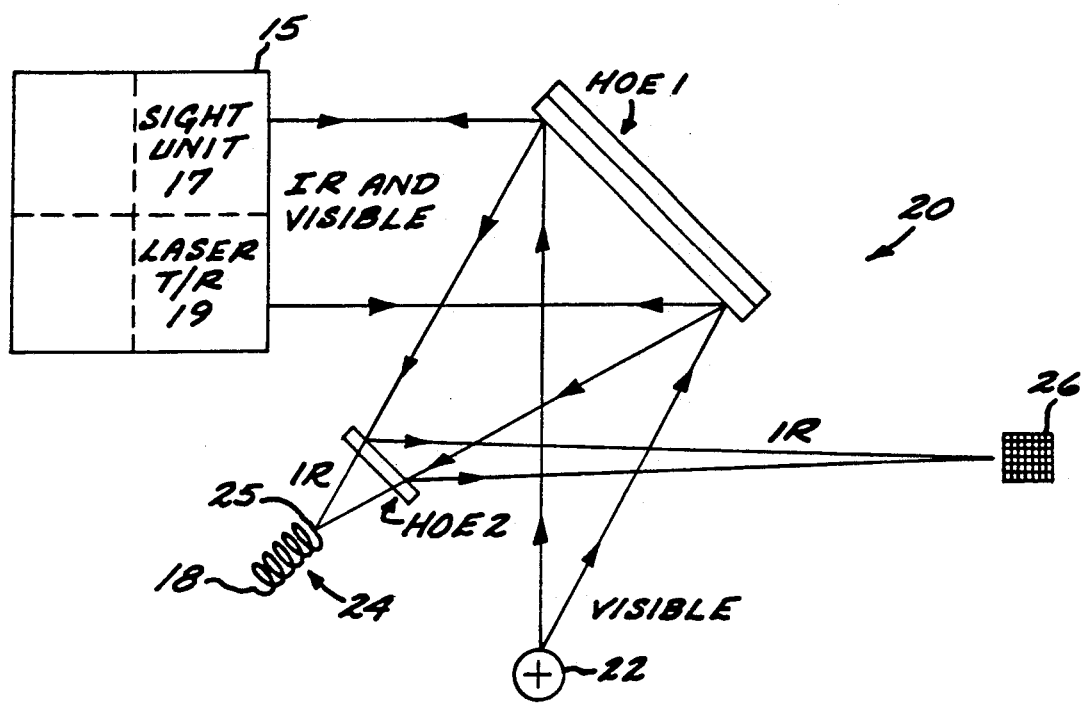
FIG. 1 is a schematic block diagram of a test system embodying the invention for testing a laser rangefinder system.

FIG. 1 is a simplified block diagram of a portable rangefinder test set 20 employing HOEs in accordance with the invention. A typical rangefinder 15 under test comprises a sight unit 17 operating at visible wavelengths and a laser transmitter-receiver unit 19 operating at an IR wavelength (for example, 1.06 μm). For collimated incident IR and visible energy, the first HOE (HOE 1) splits the visible wavelength portion of the incident energy from the IR wavelength portion of the incident energy. The visible wavelength portion is focused to a visual reticle 22 and the IR part is focused to the fiber optic delay line 24. A second HOE (HOE 2) is placed in the path of the converging IR energy beam portion such that a portion of the IR energy incident on the HOE 2 is reflected and focused to the photodiode detector array 26, with the rest of the incident IR energy passing through HOE 2 and continuing to converge to the optical fiber delay line 24.

The optical fiber delay line 24 comprises an optical fiber of predetermined length. The light entering the fiber at one end 25 will be reflected back from the other end 18 re-emit with a certain delay time. An exemplary commercially available optical fiber delay line suitable for the purpose is the QFS-200W model, available from Quartz Products Corporation, 688 Somerset St., Plainfield, N.J. 07061.

The photodiode detector array 26 is a solid state imaging device such as is used in common CCD video cameras. An exemplary commercially available array is the MC520 model, available from EG&G Reticon, 345 Potrero Avenue, Sunnyvale, Calif. 94086.

The visual reticle 22 generates a cross-hair reticle image which is directed onto HOE 1 and reflected to the sight-unit 17 of the rangefinder 15. An exemplary visual reticle suitable for the purpose is commercially available as the model 04RET003 from Melles Griot, 1770 Kettering Street, Irvine, Calif. 92714.

The rangefinder 15 is aligned so that the visual reticle image is seen in the eye-piece of the sight unit 17. Once the rangefinder has been so aligned, the IR laser transmitter 19 of the rangefinder 15 is fired to generate an IR laser beam. The position of the visual reticle 22 is related to that of the photodetector array 26 such that, if the sight unit 17 of the rangefinder is properly aligned with the laser transmitter unit 19, the IR laser energy will be incident at the center of the detector array 26. If the laser energy is not centered on the array 26, this is an indication of misalignment.

A portion of the laser light from the rangefinder 15 is also incident of the optical fiber delay line 24, and is reflected at the line end 18, so that the reflected light is directed back at the rangefinder 15. The delay line 24 has a known optical length, which can be used to test the rangefinding accuracy of the device 15 under test.

In operation, HOE 1 functions as a collimator for the visual reticle 22. That is, the light emitted from the reticle 22 is collimated through HOE 1 and directed into the rangefinder's sight unit 17 for aiming. HOE 1 also functions as the focusing optics for focusing the IR energy at the input to the optical fiber delay line 24. At the same time, HOE 1 combines with HOE 2 to form a telephoto system. A telephoto system is a two-element optical system with one converging and one diverging optical element. When properly arranged, a telephoto system can provide a very long focal length with a relatively short system length. The advantage of a telephoto system in the apparatus of FIG. 1 is to provide large magnification in a compact system.

Figure 2:
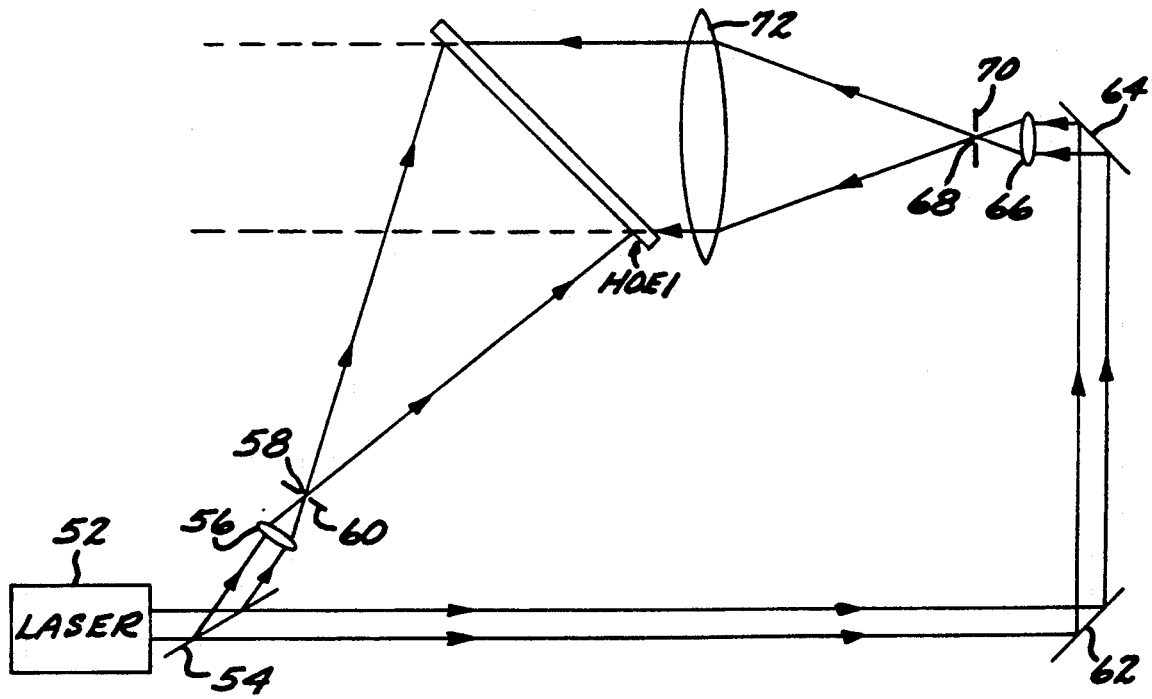
FIG. 2 is an illustrative optical system for the construction of the infrared hologram embodied in the system of FIG.1.

HOE 1 can be implemented as a single hologram with dual exposures, or as two holograms glued together, one for IR wavelength selection and the other for visual wavelength selection. FIG. 2 shows an illustrative set-up for the construction of the IR hologram comprising HOE 1. The laser 52 generates a laser beam at a selected wavelength, e.g., 0.528 micron. The laser 52 may comprise, for example, an Argon laser. The laser beam is split into two paths by beamsplitter 54. The first path is through lens 56, which focuses the incident energy at an aperture 58 formed in plate 60, thereby creating a point source. The location of the aperture 58 corresponds to the location of the input 25 to the optical delay line 24 of FIG. 1. The second path forms a collimated beam, the light transmitted through the beamsplitter 54 being reflected from mirrors 62 and 64 onto lens 66. The lens 66 focuses the light at aperture 68 in plate 70, forming a second point source whose light is directed through collimating lens 72 to form a collimated light beam. The interference of the two wavefronts from the point source at aperture 58 and the collimated beam from lens 72 will produce a reflective HOE with the desired focusing property.

Figure 3:
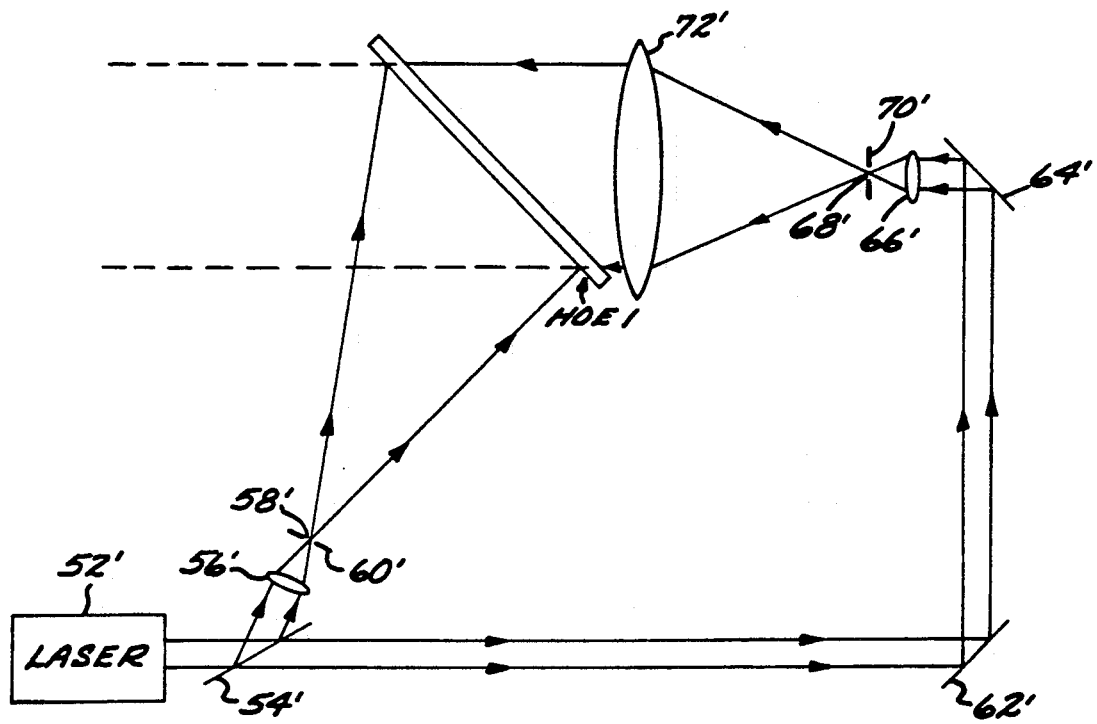
FIG. 3 is an illustrative optical system for the construction of the visible light hologram embodied in the system of FIG. 1.

For the visual light selective hologram comprising HOE 1, a similar set-up to that shown in FIG. 2 can be used with the location of the point source being shifted to the place of the visual reticle 22 of FIG. 1. FIG. 3 illustrates such a set-up, with the elements 52'-72' corresponding to the elements 52-72 of FIG. 2.

Figure 4:
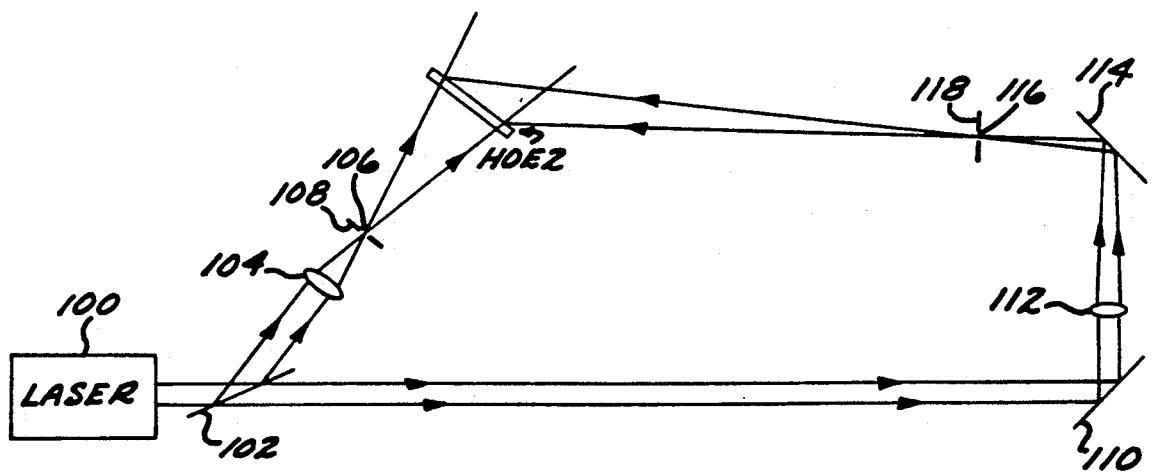
FIG. 4 is an illustrative optical system for the construction of the second holographic optical element employed in the system of FIG. 1.

HOE 2 can be constructed with two point sources as shown in FIG. 4. Here, the laser 100 light beam is incident on beamsplitter 102 which divides the beam into two portions, a first portion directed to lens 104 and the second portion directed to mirror 110. Lens 104 focuses the incident light at aperture 106 formed in plate 108, thereby forming a point source of light projected on HOE 2. The point source at aperture 106 is located at the position of the input 25 to the optical fiber delay line -24 of FIG. 1. The light incident on mirror 110 is reflected through lens 112 and reflected again by mirror 114. Lens 112 focuses the light at aperture 116 in plate 118, thereby forming a second point source located at the plane of the photodiode detector array 26 of FIG. 1.

Because most holographic materials are not sensitive to IR wavelength light at 1.06 μm, one of the following methods may be used to construct the IR hologram comprising HOE1 and HOE 2. The first method uses visible light with the recording angle different from the playback angle. The necessary angular shifting can be calculated from the anticipated wavelength shifting. For example, if the desired playback angle is $\theta$, the recording angle should be $\theta' = \mu\theta$, where $\mu$ is the ratio of the playback light wavelength to the recording wavelength. See, "Optical Holography," R.J. Collier et al., Academic Press, 1971, page 76.

The second method is the gelatin expansion technique, which can be used during dichromated gelatin processing. The curing time in the processing will determine the expansion factor. This method expands the small grating spacings that are recorded with a shorter (visible) wavelength into larger grating spacings that will respond to a longer (IR) wavelength. The expansion factor should be just the ratio of the playback wavelength to the recording wavelength. See, "Handbook of Optical Holography," H.J. Caulfield, Academic Press, 1979, at page 284.

The third method uses computer-generated holograms; that is, uses a computer to calculate the required interference pattern and to drive a plotter to draw the pattern. See, e.g., "Optical Holography," R.J. Collier et al., Academic Press, 1971, at Chapter 19.

The system of this invention, as shown in FIG. 1, contains only two light weight HOEs which can be simply mounted. Also, the use of a telephoto configuration gives a compact system with a long focal length. Conventional designs contain many traditional optical elements which are heavy and bulky, and require complicated mechanical design to mount these elements. The new design has advantages of being light, compact, and easy to assemble and maintain.

It is understood that the above-described embodiment is merely illustrative of the possible specific embodiments which may represent principles of the present invention. Other arrangements may readily be devised in accordance with these principles by those skilled in the art without departing from the scope of the invention.

What is claimed is:

1. A testing system, for testing an electro-optic rangefinder having a sight unit operating at visible light wavelengths, and a laser transmitter-receiver unit operating at infrared wavelengths, the testing system including a visual reticle, an optical delay line and a detector responsive to laser light, means for testing alignment of the sight unit with the laser transmitter-receiver unit and for testing rangefinding performance, said testing system further characterized in that holographic optical elements are employed to selectively distribute and focus (i) visible light emitted by the visual reticle to said sight unit, (ii) laser light emitted by said laser to said optical delay line and to said detector, and (iii) infra-red light re-emitted from said optical delay line back to said laser receiver.

2. Apparatus for testing alignment of a first optical path with a second optical path, said apparatus comprising:
    a detector responsive to incident energy of a first wavelength or wavelength range;
    a test object for reflecting visible wavelength energy; and
    holographic optical means for:
        (a) receiving said visible wavelength energy from said test object, collimating said energy and directing said energy along a first optical path; and
        (b) receiving energy of said first wavelength or wavelength range from along a second optical path;
        said test object and said detector being cooperatively placed such that if said second optical path is properly aligned with said first optical path said holographic optical means will focus and direct said energy of said first wavelength or wavelength range onto said detector.

3. The apparatus of claim 2 wherein energy of said first wavelength or wavelength range is infrared energy.

4. The apparatus of claim 2 wherein said test object is a reticle.

5. The apparatus of claim 2 wherein said detector is an array of detector elements and said holographic optical means focuses said energy of said first wavelength or wavelength range onto a predetermined area of said array.

6. The apparatus of claim 5 wherein said predetermined area is a central area of said array.

7. The apparatus of claim 2 further comprising:
    an optical delay line having a predetermined optical length; and
    said holographic optical means further comprising means for focusing and directing a portion of said energy of a first wavelength of wavelength range onto said optical delay line and for receiving and directing energy re-emitted by said optical delay line back along said second optical path.

8. The apparatus of claim 7 wherein said holographic optical means comprises a first holographic optical element and a second holographic optical element;
    said first holographic optical element for;
        (a) receiving said visible wavelength energy from said test object, collimating said energy and directing said energy along a first optical path; and
        (b) receiving energy of said first wavelength or wavelength range from along a second optical path and directing said energy toward said second holographic optical element;
    said second holographic optical element for:
        (c) receiving energy of said first wavelength or wavelength range from said first holographic optical element;
        (d) focusing a first portion thereof onto said optical delay line;
        (e) directing energy re-emitted by said optical delay line back toward said first holographic optical element for direction back along said second optical path; and
        (f) directing a second portion thereof onto said detector.

9. The apparatus of claim 8 wherein said first and second holographic optical elements form a telephoto system that provides a relatively long focal length in relation to the system length.

10. The apparatus of claim 8 wherein said first holographic optical element comprises two holograms adhered together, a first one of said holograms being selective to light of said first wavelength or wavelength range and a second hologram being selective to visible light energy.

* * * * *